3,302,994
PROCESS PRODUCING CERIUM MOLYBDATE,
TUNGSTATE AND VANADATE
Erich Ruf, Essen, Germany, assignor, by mesne assignments, to Ronson Corporation, Woodbridge, N.J.
No Drawing. Filed July 23, 1965, Ser. No. 474,482
Claims priority, application Germany, Oct. 27, 1960,
G 30,800; Oct. 7, 1961, G 33,279
15 Claims. (Cl. 23—23)

This is a continuation-in-part application of my copending application Serial No. 147,033, filed October 23, 1961, now abandoned.

This invention generally relates to rare earth metal salts and is particularly directed to a process of preparing pure cerium (IV) molybdate, cerium (IV) tungstate and cerium (IV) vanadate.

The characteristics of the lanthanides are generally of aperiodic nature, i.e., they change uniformly or constantly with increasing atomic number. A few characteristics or properties of the elements of the atomic numbers 58 through 71, however, exhibit a periodic course and thus render it possible to arrange the rare earth metals in a periodic system of the lanthanides. Thus, for example, the valence of the elements of the atomic numbers 58 through 71 is of periodic nature. From such a periodic system it can be readily recognized that particularly cerium is not only trivalent but, in some instances, exhibits quadrivalent properties.

Only in its trivalent form does cerium exhibit properties which are characteristic of an element of the rare earth metal group. In its quadrivalent state cerium has chemical characteristics which are related to those of zirconium and thorium.

The present invention is based on the surprising observation that quadrivalent cerium in solution, as contrasted to trivalent cerium and other lanthanides, can be precipitated with certain soluble molybdate, tungstate and vanadate compounds under predetermined reaction conditions to form pure precipitates of cerium (IV) molybdate, cerium (IV) tungstate and cerium (IV) vanadate respectively. These quadrivalent cerium salts are soluble with difficulty only.

According to this invention, it has been ascertained that such precipitation takes place if the quadrivalent cerium is present in an acid, preferably nitric acid, solution.

For the purpose of obtaining high yields of cerium (IV) molybdate, it is advantageous to precipitate and separate the salt from weakly nitric acid solutions.

The quadrivalent cerium is supplied by, for example, dissolving ammonium cerium (IV) nitrate or sodium cerium (IV) nitrate in water, while the molybate, tungstate or vanadate moiety may be supplied by dissolving the respective sodium or ammonium salt.

Upon precipitation of quadrivalent cerium in solution with molybate, pure cerium (IV) molybdate is obtained which consists of $CeO_2$, $MoO_3$ and OH or $H_2O$ and is constitutionally devoid of any extraneous elements or contaminants.

Quantitative precipitation of cerium (IV) molybdate is accomplished if the pH is adjusted during or immediately after the precipitation to a value within the range of 1.0 to 1.6. In doing so, it is of no consequence whether the precipitation is performed with sodium or ammonium molybdate. The precipitation proper may be carried out either by adding a nitric acid solution of quadrivalent cerium to an ammonium or sodium molybdate solution or, in the alternative, by adding the molybdate solution to a nitric acid solution containing the quadrivalent cerium.

After the precipitant has been added, the solution is adjusted to a pH value within the range of between 1.0 to 1.6 and is heated for a short period of time. Upon settling of the precipitate and washing, the cerium (IV) molybdate is obtained as a water containing product, the amount of water being dependent on the degree of drying.

A quantitative precipitation of the quadrivalent cerium in solution is arleady obtained if the ratio of cerium to molybdenum in the solution is about 1:1, provided a pH value within the range previously mentioned is maintained. However, it is advantageous to use the ammonium or sodium molybdate in slight excess to the stoichiometrically required amount. The precipitated, probably basic, cerium (IV) molybdate has then a cerium:molybdenum ratio of 1:1.

If the ratio of cerium of molybdenum in the precipitating mixture is 1:2 or even lower, a cerium (IV) molybdate having an approximate ratio of cerium:molybdenum of 1:2 is obtained. If the molybdate solution is employed in a higher ratio than cerium:molybdenum of 1:2, free molybdic acid is co-precipitated. The product thus obtained, dependent on the amount of co-precipitated free molybdic acid, has varying cerium:molybdenum ratios.

An equivalent reaction takes place if quadrivalent cerium in nitric acid solution is precipitated with a tungstate solution to form cerium (IV) tungstate. Again, ammonium or sodium tungstate may be used as precipitant, while the quadrivalent cerium is supplied in the form of ammonium or sodium cerium (IV) nitrate.

Pure cerium (IV) tungstate is obtained in this manner, which consists of $CeO_2$, $WO_3$ and $H_2O$, and constitutionally contains no extraneous elements or contaminants.

The pH value, in case cerium (IV) tungstate is to be produced, should be about 0.8 and should be adjusted either during or immediately after the precipitation. If this pH value is maintained in this manner, an almost quantitative precipitation takes place provided a sufficient amount of tungstate solution is applied.

In the production of cerium (IV) tungstate, it should be borne in mind that the nitric acid quadrivalent cerium solution should be added to the tungstate solution and not vice versa, as generally upon acidifying an alkali metal tungstate solution, free tungstate acid percipitates. Quadrivalent cerium may be almost quantitatively precipitated with tungstate by employing the precipitant in a ratio of cerium:tungstate of about 1:1. Contrary to the otherwise analogous cerium (IV) molybdate, the cerium (IV) tungstate may be converted into a cerium (IV) tungstate with a ratio of cerium:tungstate of 1:2 by heating with nitric acid at a pH of 0.8. If the precipitant is employed in a ratio of cerium:tungsten which is greater than 1:2, then the amount of tungstate which exceeds this ratio is almost quantitatively precipitated in the form of free tungstic acid.

Therefore, contrary to the analogous cerium (IV) molybdate reaction, the amount of precipitant in the precipitation of cerium (IV) tungstate has to be employed in exactly stoichiometrical amounts in order to prevent a coprecipitation of free tungstic acid.

For the purpose of ascertaining whether or not free tungstic acid has been co-precipitated with cerium (IV) tungstate, a test with concentrated hydrochloric acid can be carried out. Thus, if pure cerium (IV) tungstate which has a cerium:tungsten ratio of 1:1 or 1:2 is treated with hydrochloric acid, a clear solution is first obtained if a sufficient amount of hydrochloric acid is used. From this clear solution tungstic acid can be precipitated either at boiling temperature or upon dilution with water. However, in the event that the cerium (IV) tungstate also contains co-precipitated free tungstic acid, then the treatment with concentrated hydrochloric acid does not yield a clear solution as tungstic acid is not dissolved by hydrochloric acid.

In similar manner, pure cerium (IV) vanadate can be obtained by precipitation of quadrivalent cerium if an acid, preferably nitric acid, solution containing the quadrivalent cerium is treated with sodium or ammonium vanadate.

The precipitation takes place in a similar manner as in the case of cerium (IV) tungstate and/or cerium (IV) molybdate.

An almost quantitative precipitation can be obtained if the precipitation is carried out at a pH value within the range of 1.0 to 2.0, which value should be adjusted prior to or during the precipitation, and provided the amount of vanadate is sufficient to result in a ratio cerium:vanadate of about 1:1. However, for practical purposes, it is advantageous, particularly at low pH values, to employ the sodium or ammonium vanadate in a slight excess with regard to the stoichiometrically required amount. The cerium (IV) vanadate which is precipitated in this manner has a cerium:vanadium ratio of about 1:1.

Surprisingly, this ratio of cerium:vanadium of 1:1 is not significantly changed, even if the precipitant is used in larger amounts, that is, if the ratio of cerium:vanadium in the reaction mixture is greater than 1:1. However, if a very large excess of vanadate is used, free vanadic acid may be co-precipitated. For the purpose of obtaining a high yield or a ratio between cerium and vanadium of about 1:1, it is recommended to admix the quadrivalent cerium solution, upon adjustment to a pH of 1.0 to 2.0, with the vanadium solution at room temperature and under agitation and thereafter, while still agitating, to heat the solution to about 80–100° C.

After the settling of the precipitate, the cerium (IV) vanadate thus obtained is washed repeatedly with warm water or the supernatant liquor is repeatedly decanted and the precipitate is dried at 110° C.

In the event that the cerium (IV) solution upon adjustment to the indicated pH range is first heated to boiling point and the vanadium solution is added at boiling temperature under stirring, a cerium (IV) vanadate is obtained, particularly at low pH values, which contains less vanadium than if the previously described procedure is followed. In other words, the ratio of cerium:vanadium in the precipitate will be less than 1:1. The same applies if the vanadate solution, prior to the admixture, is first adjusted to the same pH range.

The inventive process for the production of cerium (IV) molybdate, cerium (IV) tungstate and cerium (IV) vanadate is also suitable for selectively precipitating quadrivalent cerium from solutions which contain mixtures of several rare earth metals, including trivalent cerium. This is so as only quadrivalent cerium will be precipitated in the inventive manner while the trivalent cerium and other rare earth metals will not be affected by the addition of the precipitant. If the precipitation of quadrivalent cerium from such mixtures of rare eath metals is desired, trivalent certain in the solution may first be oxidized to quadrivalent cerium, if necessary, whereafter the precipitation will be effected in the described manner. The quadrivalent cerium will thus be precipitated in the form of molybdate, tungstate or vanadate, as the case may be, whereafter the precipitate can be easily separated from the other rare earth metals in the solution.

The cerium salts produced in accordance with the process of this invention are most suitable for the dyeing of glass and may also be used in the production of dyestuffs containing tin oxide or zirconium oxide. These dyestuffs may be successfully used as yellow pigments for the dyeing of ceramic products.

Further, the pure cerium (IV) molybdate, cerium (IV) tungstate and cerium (IV) vanadate may be further processed into pure ceric or cerous oxides.

The invention will now be described by several examples, it being understood however that these examples are given by way of illustration and not by way of limitation, and that many changes and alterations may be effected in the process conditions without affecting in any way the scope and spirit of this invention as recited in the appended claims.

EXAMPLE I

*Production of pure cerium (IV) molybdate*

10 grams of ammonium cerium (IV) nitrate were dissolved in 10 liters of water. An ammonium molybdate solution containing 3.2 grams of ammonium molybdate [$(NH_4)_6(Mo_7O_{24}) \cdot 4H_2O$] in 250 milliliters of water were added to the quadrivalent cerium solution under stirring. The addition of the ammonium molybdate solution caused the precipitation of a large proportion of the quadrivalent cerium in the form of cerium (IV) molybdate. Disregarding this fact, the solution was adjusted to a pH of 1.45 and was heated to 45° C. After settling of the precipitate, the precipitate was filtered off through a blue band filter and was washed with water until it was free of nitrate. Thereafter, the precipitate which was obtained quantitatively was dried at 110° C. The product was ground and had a yellow color.

A 100% yield of the cerium (IV) molybdate calculated on cerium was also obtained in a second experiment wherein the amount of molybdate was increased, so that the ratio of cerium:molybdenum in the reaction mixture was not 1:1 but 1:2.

Identical results were obtained by using sodium cerium (IV) nitrate and sodium molybdate as reactants.

EXAMPLE II

*Production of cerium (IV) tungstate*

250 grams of ammonium cerium (IV) nitrate were dissolved in 5 liters of water which contained 1 liter of concentrated nitric acid. This solution was added to a sodium tungstate solution which contained 150 grams of $Na_2WO_4 \cdot 2H_2O$ in 50 liters of water. By adding ammonia, the reaction mixture thus obtained was adjusted to a pH value of 0.8 and was thereafter heated to about 95° C. for thirty minutes. After settling of the precipitate thus formed, the precipitate was decanted several times with warm water. The washed product whose yield, calculated on cerium, was 100%, was then dried at a temperature of 110° C. The dry ground cerium (IV) tungstate had a yellow color.

Similar results were obtained with sodium cerium (IV) nitrate and ammonium tungstate.

EXAMPLE III

*Production of cerium (IV) vanadate*

10 grams of ammonium cerium (IV) nitrate were dissolved in 4 liters of water, containing 20 milliliters of concentrated nitric acid. The solution was adjusted to a pH value of 1.5. Thereafter, solution containing 2.8 grams of sodium vanadate ($NaVO_3 \cdot 1H_2O$) in 100 milliliters of water is added to the cerium solution. Cerium (IV) vanadate precipitates from the reaction mixture which was heated to about 80 to 100° C. After settling, the precipitate, which was obtained almost quantitatively, was washed by decanting with hot water until the precipitate was free of nitrate. The washed precipitate consists of pure cerium (IV) vanadate and the yield is 100%. The washed product is dried at 110° C. The dried ground cerium (IV) vanadate has a brownish-yellow color.

EXAMPLE IV

[Tests performed in respect to T. Banerjee's article, "Photochemical Reactions With Some Inorganic Colloids As Active Agents Under the Influence of Light in Various States of Polarisation, Part XVI, Photochemical Reduction of Ceric Tungstate Sol by Glucose," Journal of the Indian Chemical Society, vol. 22, pages 280–281, 1945]

The author of the above-indicated article states in his article as follows:

"*Preparation of the sol.*—An unstable colloidal solution of ceric tungstate is obtained when 0.5 g. of sodium tungstate, dissolved in 100 cc. of distilled water are added while shaking to 100 cc. of 6% aq. solution of ceric ammonium nitrate. This sol coagulated on standing for some time. On dialysis with distilled water (pH near about 6), the coagulation is rather accelerated. But when dialysis is carried out with the help of a very dilute solution of $HNO_3$ (pH 4) colloidal ceric tungstate, which remains stable for several days, is formed. The stability is due to a small amount of adsorbed ceric salt. And if this stabilising ceric salt is removed by adding a reducing agent, such as glucose or laevulose, which instantaneously reduces ceric salt in the dark, the sol coagulates immediately. Hence it is unsuitable for investigations on photochemical reactions especially photochemical reductions.

"The stabilising ceric ion can, however, be replaced by a polyvalent cation which is not easily reduced by glucose, laevulose etc. Thorium nitrate was chosen for the purpose. To 20 litres of distilled water is added 3 g. of thorium nitrate and the pH is kept near about 4 by adding nitric acid. This constitutes the dialysing liquid. When the ceric tungstate sol prepared as usual, is dialysed with the above liquid, thorium ion gradually replaces stabilising ceric ion. When glucose is added to this dialysed sol, it no longer coagulates. This sol increases in viscosity very slowly and can be kept stable for months.

"By a similar method ceric molybdate, vanadate etc. may be prepared and the process may be extended for the preparation of other complex ceric sols."

Banerjee's publication thus is allegedly concerned with photochemical reduction of ceric tungstate sols (colloidal solutions), to wit, quadrivalent cerium tungstate sols by glucose. The article teaches the production of quadrivalent cerium tungstate sols which are stable to a varying extent. The author points out that a sol which is produced in the absence of acid tends to coagulate after some time. The author furthermore reports that the coagulation proceeds more rapidly upon dialysis with distilled water, while upon dialysis in weakly nitric acid solutions (pH 4) the dilute colloidal quadrivalent cerium tungstate solution allegedly remains stable for several days. It is suggested by the author that this stability is due to a small amount of adsorbed ceric salt. If the adsorbed amount of quadrivalent cerium salt is replaced by a polyvalent cation, as it is for example present in thorium nitrate, then, in accordance with the teachings of the article, a colloidal solution is obtained which remains stable for many months. Contrary to the sols which have been stabilized with quadrivalent cerium salts, the cerium (IV) tungstate salts which have been stabilized with thorium salt cannot be reduced with glucose. It is thus clear from Banerjee's disclosure that no pure quadrivalent cerium tungstate precipitates are obtained if his procedure is followed. The author merely emphasizes that under the indicated process conditions, colloidal solutions of quadrivalent cerium tungstate are obtained whose stability is exclusively due to adsorbed cerium salts or compounds which contain analogous polyvalent cations. Coagulation can only be effected by reduction. Glucose and laevulose are mentioned as reduction agents. The author does not identify the composition of the coagulation product which is obtained. However, in view of the reduction which has been carried out with glucose, it must be assumed that trivalent cerium compounds are formed since the adsorbed quadrivalent cerium salt amount, according to Banerjee's teaching, is likewise transformed into cerium (III) ions. To the extent that coagulation phenomena occur in aqueous solution, it may reasonably be assumed that these are caused by a formation of a cerium (III) compound due to the cerium (IV) ion/cerium (III) ion equilibrium which prevails in an aqueous or acid solution. It is thus clear that Banerjee merely teaches the formation of cerium (IV) tungstate *sols*, but not the formation of a solid pure cerium (IV) tungstate. It should also be pointed out that upon slightly acidifying a tungstate solution, colloidal tungstic acid solutions tend to form. Since Banerjee does not indicate the composition of the colloidal solutions, it is likely that the colloidal solutions obtained by him contain tungstic acid in colloidal form.

In order to gain some insight in respect to the phenomena which actually occur and the compounds which are formed in the process as taught in the Banerjee article, extensive experiments were conducted in which the teachings of Banerjee were closely followed and the results examined.

The following test was carried out in accordance with Banerjee's teaching:

(1) 0.5 g. of sodium tungstate was dissolved in 100 ml. of distilled water. The solution thus obtained was added under agitation and shaking to 100 ml. of a 6% aqueous solution of ceric ammonium nitrate (ammonium cerium (IV) nitrate). A slight turbidity was observed at the area where the sodium tungstate solution entered the ceric ammonium nitrate solution. This turbidity, however, disappeared immediately upon shaking and agitation. After the entire amount of sodium tungstate solution had been added, a clear solution was obtained which contained neither a precipitation product nor a sol. For this reason no coagulation took place, even after prolonged standing. The clear solution obtained had a pH value of 1.

Accordingly, the teaching of Banerjee to the effect that a sol is formed which coagulates upon standing is not correct. Consequently, since no precipitate and no sol were obtained, no analysis of any product could be carried out.

(2) In order further to investigate the matter and in view of the negative results obtained, the test was repeated with the difference that, after the addition of the sodium tungstate solution to the ammonium cerium (IV) nitrate solution, the pH value of the resulting solution was raised to 4 and in a third test to 6. This pH adjustment was effected because Banerjee states that upon dialysis with distilled water of a pH of about 6, a relatively rapid coagulation takes place, while upon dialysis with diluted nitric acid of a pH of about 4, colloidal cerium (IV) tungstate is allegedly obtained. However, in conformity with the original composition of the solution, the adjustment of the pH values in the indicated manner, results in hydrolysis (cerium is present in the clear solution in large excess relative to tungsten). Analysis of the hydrolysis products obtained in this manner and after drying at 110° C. resulted in the following values:

| | Percent |
|---|---|
| pH=4. | |
| $CeO_2$ | 68.3 |
| $WO_3$ | 14.1 |
| $NH_3$ | 1.8 |
| $H_2O$ | 15.8 |

Based on these analysis results, the following molar ratios are calculated with respect to the hydrolysis product obtained at a pH 4:

$$CeO_2:WO_3:NH_3:H_2O = 6.5:1:1.75:16.5$$

The water content of the hydrolysis product was obtained in the following manner:

The product heated at 110° C. was further heated to 800° C. and the weight loss was established. After deducting the amount of analytically ascertained NH₃ content, the water content of the product can thus readily be established.

|  | Percent |
|---|---|
| pH=6. |  |
| CeO₂ | 73.5 |
| WO₃ | 13.8 |
| NH₃ | 0.7 |
| H₂O | 12.0 |

The analysis results of the hydrolysis product obtained at a pH 6 yields the following molar ratios:

$$CeO_2:WO_3:NH_3:H_2O = 10:1.5:1:16$$

It is thus evident that Banerjee's teaching does not include the preparation of a pure quadrivalent cerium tungstate. If the pH value of the clear solutions obtained in accordance with Banerjee's teaching is raised to 4 or 6, respectively, precipitates of cerium hydroxide or cerium oxydehydrate and tungstic acid of the above mentioned composition are obtained corresponding to the composition of the solution and the respective extent of hydrolysis. These precipitates contain also water and ammonia. Of course, these hydrolysis products do not constitute pure quadrivalent cerium tungstate and consequently Banerjee is not relevant in respect to the present invention.

EXAMPLE V

[Tests in respect to the article by Rane et al., "A Note on the Vanadates of Heavy Metals," as appearing in the Journal of the Indian Chemical Society, vol. 8 (1931), pages 289 through 292]

The authors of this article state as follows:

"*Cerium vanadate.*—With ceric nitrate and excess of ammonium vanadate, a yellowish white precipitate is obtained. This rapidly changes to dark brown. With excess of ceric nitrate, no darkening takes place. On using a satuarated (sic) solution of ceric sulphate, however, a beautiful light yellow precipitate is thrown down, which settles readily. The compound is crystalline and on heating in a closed tube, it loses water and decomposes leaving behind a mixture of CeO₂ and V₂O₅. The analysis of a dried sample shows the composition to be 3CeO₂·V₂O₅·9H₂O. (Found: CeO₂, 59.90; V₂O₅, 21.15; H₂O (by difference), 18.95. 3CeO₂,V₂O₅,9H₂O requires CeO₂, 60.17; V₂O₅, 21.08; H₂O, 18.75 percent.)"

The publication thus teaches that a yellowish-white precipitate is obtained upon reacting ceric nitrate and an excess of ammonium vanadate. The employment of an acid medium is not mentioned in the article. The publication indicates that the precipitates tend rapidly to assume a dark brown color. This is avoided if an excess of ceric nitrate is used. Further a light yellow precipitate is obtained if a saturated solution of ceric sulfate is employed. This precipitate, in accordance with Rane's teaching, settles readily and is crystalline. Consequently, it must reasonably be concluded that the first mentioned precipitate is not crystalline. The analysis appearing at the end of the article (page 292), which apparently refers to the second precipitate, does not permit any conclusions in respect to the valence of the cerium in the compound since, quite evidently, only cerium, vanadium and the form of the oxides were determined, while the differential amount was calculated in the form of water. However, it would be perfectly feasible that the precipitate in fact contained ammonium. Accordingly, the exact mole relationship cannot be learned from the Rane disclosure nor does the article teach that the process is to be performed in an acid medium. Of course nothing is said in respect to the formation of pure quadrivalent cerium products.

Nevertheless, experiments were carried out, in order to investigate the reaction mechanism of the process as reported by Rane. The performance of these experiments was rendered somewhat difficult due to the fact that Rane does not teach any quantities in respect to the reagents to be used in precipitating the cerium vanadate as suggested by him. For this reason, quadrivalent cerium nitrate and ammonium vanadate were reacted with each other in the form of aqueous solutions in different proportions as will appear from the following tests.

In accordance with the first sentence of Rane's article as quoted above, wherein Rane refers to an excess of ammonium vanadate, the first tests were performed with a cerium:vanadate ratio of 1:4. Thereupon, precipitations with excess of ammonium vanadate of 10, 20 and 30% relative to the first mentioned ratio of 1:4 were formed. Additional tests were performed with 10, 20 and 30% excess of quadrivalent cerium nitrate relative to the first mentioned ratio. In all these tests brown-colored precipitates were obtained after drying at 110° C. Analysis established that this brown color is due to precipitation of free vanadic acid.

The analysis of the individual precipitation products dried at 110° C. was as follows:

(a) Ce:V=1:4

|  | Percent |
|---|---|
| CeO₂ | 48.32 |
| V₂O₅ | 46.45 |
| NH₃ | 0.71 |
| H₂O | 4.52 |

$$CeO_2:V_2O_5:NH_3:H_2O = 6.9:6.4:1:6.25$$

(b) 10% ammonium vanadate excess

| CeO₂ | 46.24 |
|---|---|
| V₂O₅ | 47.3 |
| NH₃ | 0.93 |
| H₂O | 5.53 |

$$CeO_2:V_2O_5:NH_3:H_2O = 4.9:4.6:1:5.6$$

(c) 20% ammonium vanadate excess

| CeO₂ | 44.84 |
|---|---|
| V₂O₅ | 47.5 |
| NH₃ | 1.73 |
| H₂O | 5.73 |

$$CeO_2:V_2O_5:NH_3:H_2O = 2.6:2.6:1:3.3$$

(d) 30% ammonium vanadate excess

| CeO₂ | 46.83 |
|---|---|
| V₂O₅ | 46.9 |
| NH₃ | 0.80 |
| H₂O | 5.47 |

$$CeO_2:V_2O_5:NH_3:H_2O = 5.8:5.1:1:6.5$$

(e) 10% cer-IV-nitrate excess

| CeO₂ | 45.18 |
|---|---|
| V₂O₅ | 45.6 |
| NH₃ | 1.34 |
| H₂O | 7.88 |

$$CeO_2:V_2O_5:NH_3:H_2O = 3.3:3.17:1:5.5$$

(f) 20% cer-IV-nitrate excess

| CeO₂ | 46.63 |
|---|---|
| V₂O₅ | 45.25 |
| NH₃ | 0.97 |
| H₂O | 7.15 |

$$CeO_2:V_2O_5:NH_3:H_2O = 4.7:4.4:1:7.0$$

(g) 30% cer-IV-nitrate excess

| CeO₂ | 46.72 |
|---|---|
| V₂O₅ | 43.9 |
| NH₃ | 0.78 |
| H₂O | 8.60 |

$$CeO_2:V_2O_5:NH_3:H_2O = 5.8:5.2:1:10$$

As will be evident from the results of the above analysis, the precipitation products obtained are mixtures of cerium hydroxide and cerium oxide hydrate with vanadic acid which products moreover contain ammonia. All precipitation products have a stable color which did not become darker, contrary to Rane's contention.

The Rane publication is also concerned with precipitates obtained with an excess of quadrivalent cerium nitrate. Since, as previously mentioned, the Rane publication does not mention any quantities, the precipitations were performed in accordance with the ratio as can be calculated from the formula in the Rane article, to wit, a ratio $3CeO_2 \cdot 1V_2O_5$. Moreover, precipitations with 10, 20 and 30% excess of ammonium vanadate relative to this last mentioned ratio were performed. Furthermore, precipitations with 10, 20 and 30% excess of cerium-IV-nitrate relative to this ratio were effected. The following results were obtained.

Analysis of the precipitation products upon drying at 110° C.:

(a) $3CO_2 \cdot 1V_2O_5$

| | Percent |
|---|---|
| $CeO_2$ | 58.96 |
| $V_2O_5$ | 19.15 |
| $NH_3$ | 2.53 |
| $H_2O$ | 19.36 |

$CeO_2:V_2O_5:NH_3:H_2O=3.25:1:1.42:10.3$ (b) 10% ammonium vanadate excess

| | |
|---|---|
| $CeO_2$ | 54.43 |
| $V_2O_5$ | 19.79 |
| $NH_3$ | 3.74 |
| $H_2O$ | 22.04 |

$CeO_2:V_2O_5:NH_3:H_2O=2.90:1:2.02:11.1$ (c) 20% ammonium vanadate

| | |
|---|---|
| $CeO_2$ | 53.48 |
| $V_2O_5$ | 21.21 |
| $NH_3$ | 4.24 |
| $H_2O$ | 21.07 |

$CeO_2:V_2O_5:NH_3:H_2O=2.68:1:2.15:10.1$ (d) 30% ammonium vanadate

| | |
|---|---|
| $CeO_2$ | 51.38 |
| $V_2O_5$ | 20.90 |
| $NH_3$ | 3.98 |
| $H_2O$ | 23.74 |

$CeO_2:V_2O_5:NH_3:H_2O=2.64:1:2.04:11.5$ (e) 10% cer-IV-nitrate excess

| | |
|---|---|
| $CeO_2$ | 59.60 |
| $V_2O_5$ | 17.78 |
| $NH_3$ | 3.54 |
| $H_2O$ | 19.08 |

$CeO_2:V_2O_5:NH_3:H_2O=3.56:1:2.13:10.9$ (f) 20% cer-IV-nitrate excess

| | |
|---|---|
| $CeO_2$ | 61.52 |
| $V_2O_5$ | 16.40 |
| $NH_3$ | 3.16 |
| $H_2O$ | 18.92 |

$CeO_2:V_2O_5:NH_3:H_2O=3.99:1:2.07:11.6$ (g) 30% cer-IV-nitrate excess

| | |
|---|---|
| $CeO_2$ | 62.22 |
| $V_2O_5$ | 14.62 |
| $NH_3$ | 3.16 |
| $H_2O$ | 20.00 |

$CeO_2:V_2O_5:NH_3:H_2O=4.54:1:2.32:13.9$

As is clear from the above analysis the precipitation products contain in all instances $NH_3$. This means that no pure quadrivalent cerium vanadate is obtained.

On top of page 292 Rane also discloses the use of quadrivalent cerium sulfate in the form of a saturated solution. For this reason precipitation of cerium vanadate by reacting quadrivalent cerium sulfate solution and ammonium vanadate solution was attempted. The test clearly indicated that predominantly cerium hydroxide or cerium oxyhydrate is precipitated. The precipitation was effected in the ratio $3CeO_2 \cdot 1V_2O_5$, corresponding to the analysis ratio as indicated by Rane. The analysis of the precipitation products after drying at 110° C. gave the following results:

| | Percent |
|---|---|
| $CeO_2$ | 53.53 |
| $V_2O_5$ | 12.55 |
| $NH_3$ | 3.66 |
| $H_2O$ | 30.25 |

$CeO_2:V_2O_5:NH_3:H_2O=4.52:1:3.12:24.4$

This analysis makes is abundantly clear that the precipitation product consists of cerium hydroxide or cerium oxydehydrate and vanadic acid, the mixture additionally containing $NH_3$. Therefore, no pure quadrivalent cerium vanadate is obtained. Consequently, Rane does not teach the formation of pure quadrivalent cerium vanadate and all his products contain $NH_3$ and water. In addition, the molar ratios of the precipitation products indicate that the products are mixtures of cerium hydroxide or cerium oxydehydrate and vanadic acid.

While specific embodiments of the invention have been shown and described in detail to illustrate the application of the inventive principles, it will be understood that the invention may be embodied otherwise without departing from such principles.

What is claimed is:

1. A process of preparing pure cerium (IV) molybdate which comprises, reacting at a pH value of about between 1.0 to 1.6 an aqueous solution of a quadrivalent cerium salt selected from the group consisting of ammonium cerium (IV) nitrate and sodium cerium (IV) nitrate with a solution of ammonium molybdate, the ratio of cerium to molybdenum in the reaction mixture being between about 1:1 to 1:2, whereby a pure cerium (IV) molybdate precipitate is formed and recovering the precipitate thus formed.

2. A process for preparing pure cerium (IV) molybdate which comprises, reacting at a pH value of about between 1.0 to 1.6 an aqueous solution of a quadrivalent cerium salt selected from the group consisting of ammonium cerium (IV) nitrate and sodium cerium (IV) nitrate with a solution of sodium molybdate, the ratio of cerium to molybdenum in the reaction mixture being between about 1:1 to 1:2, whereby a pure cerium (IV) molybdate precipitate is formed; and recovering the precipitate thus formed.

3. A process of preparing pure quadrivalent cerium (IV) molybdate which comprises preparing a solution of a quadrivalent cerium salt selected from the group consisting of ammonium cerium (IV) nitrate and sodium cerium (IV) nitrate in water, preparing an aqueous solution of a salt selected from the group consisting of ammonium molybdate and sodium molybdate, adding one of said solutions to the other one under stirring, adjusting the pH value of the resulting reaction mixture to a value of about between 1.0 to 1.6, and heating the reaction mixture for a short period, the ratio between cerium and molybdenum in the reaction mixture being at least 1:1 and not higher than 1:2, whereby a pure cerium (IV) molybdate precipitate is formed, and recovering said precipitate.

4. In a process as claimed in claim 3, wherein after the addition of said one solution to the other one, the resulting reaction mixture is heated to approximately 45° C.

5. A process of preparing pure cerium (IV) tungstate which comprises, reacting at a pH value of about 0.8 an aqueous solution containing a quadrivalent cerium salt selected from the group consisting of ammonium cerium (IV) nitrate and sodium cerium (IV) nitrate; with a solution containing a salt selected from the group consisting of ammonium tungstate and sodium tungstate, the ratio of cerium to tungsten in the solution being about 1:1 to 1:2, whereby a pure cerium (IV) tungstate precipitate is formed and recovering the precipitate.

6. In a process as claimed in claim 5, wherein the solution contains nitric acid.

7. A process of preparing pure cerium (IV) tungstate which comprises, preparing an aqueous solution of a quadrivalent cerium salt selected from the group consisting of ammonium cerium (IV) nitrate and sodium cerium (IV) nitrate, preparing an aqueous solution of a salt selected from the group consisting of sodium tungstate and ammonium tungstate, pouring the cerium containing solution into the tungsten containing solution, and adjusting the pH of the resulting reaction mixture to a value of approximately 0.8, the ratio of cerium to tungsten in the reaction mixture being approximately 1:1, whereby a pure cerium (IV) tungstate precipitate is formed, and recovering said precipitate.

8. In a process as claimed in claim 7, wherein the pH is adjusted with nitric acid.

9. A process of preparing pure cerium (IV) tungstate which comprises adding an aqueous nitric acid containing solution of a quadrivalent cerium salt selected from the group consisting of ammonium cerium (IV) nitrate and sodium cerium (IV) nitrate to an aqueous solution containing a salt selected from the group consisting of ammonium tungstate and sodium tungstate in stoichiometric amounts calculated on cerium (IV) tungstate at a pH value of approximately 0.8 and heating the reaction mixture to below the boiling point, whereby a pure cerium (IV) tungstate precipitate is formed, and recovering said precipitate.

10. A process of preparing pure cerium (IV) vanadate which comprises mixing at a pH value of approximately 1.0 to 2.0 an aqueous solution containing a quadrivalent cerium salt selected from the group consisting of ammonium cerium (IV) nitrate and sodium cerium (IV) nitrate with a solution containing a salt selected from the group consisting of ammonium vanadate and sodium vanadate, the ratio of cerium to vanadium in the reaction mixture being approximately 1:1, whereby a pure cerium (IV) vanadate precipitate is formed, and recovering said precipitate.

11. In a process as claimed in claim 10, wherein the solution contains nitric acid.

12. A process of preparing pure cerium (IV) vanadate which comprises mixing at a pH value of approximately 1.0 to 2.0 an aqueous solution containing a quadrivalent cerium salt selected from the group consisting of ammonium cerium (IV) nitrate and sodium cerium (IV) nitrate with a solution containing a salt selected from the group consisting of ammonium vanadate and sodium vanadate, the amount of vanadium in the reaction mixture being slightly in excess of the required stoichiometric amount calculated on cerium (IV) vanadate, whereby a pure cerium (IV) vanadate precipitate is formed, and recovering said precipitate.

13. In a process as claimed in claim 12, wherein the reaction mixture is heated to about 80 to 100° C.

14. In a process as claimed in claim 12, wherein the reaction mixture contains nitric acid.

15. A process for preparing pure cerium (IV) vanadate which comprises preparing an aqueous solution of a quadrivalent cerium salt selected from the group consisting of ammonium cerium (IV) nitrate and sodium cerium (IV) nitrate, preparing a solution of a salt selected from the group consisting of sodium vanadate and ammonium vanadate, adjusting the pH of the cerium containing solution to between 1.0 to 2.0, pouring one of the solutions into the other one, and heating the reaction mixture to approximately 80 to 100° C. the ratio of cerium to vanadium in the reaction mixture being about 1:1, whereby a pure cerium (IV) vanadate precipitate is formed, and recovering said precipitate.

References Cited by the Examiner

FOREIGN PATENTS 950,774   2/1964   Great Britain.

OTHER REFERENCES

Banerjee: Journal of the Indian Chemical Society, vol. 22, 1945, pages 280–281.

Mellor: Comprehensive Treatise on Inorganic and Theoretical Chemistry, Longmans, Green and Co., New York, vol. 9, 1929, pages 775 and 776.

Pascal: Noveau Traite de Chimie Minerale, Tome VII, Mason and Cie, pages 947, 950 to 952 and 985 to 987.

Rane et al.: Journal of the Indian Chemical Society, vol. 8, 1931, pages 289 to 292.

OSCAR R. VERTIZ, *Primary Examiner.*

BENJAMIN HENKIN, *Examiner.*

H. T. CARTER, *Assistant Examiner.*